(12) United States Patent
Hsueh (10) Patent No.: US 12,384,297 B2
(45) Date of Patent: Aug. 12, 2025

(54) TOWING MIRROR ASSEMBLY

(71) Applicant: KEN SEAN INDUSTRIES CO., LTD., Chang-Hua (TW)

(72) Inventor: Pi-Hsuan Hsueh, Chang-Hua (TW)

(73) Assignee: KEN SEAN INDUSTRIES CO., LTD., Chang-Hua (TW)

( * ) Notice: Subject to any disclaimer, the term of this patent is extended or adjusted under 35 U.S.C. 154(b) by 381 days.

(21) Appl. No.: 18/189,748

(22) Filed: Mar. 24, 2023

(65) Prior Publication Data
US 2024/0239268 A1    Jul. 18, 2024

(30) Foreign Application Priority Data
Jan. 16, 2023  (TW) ................. 112200561

(51) Int. Cl.
*B60R 1/078*    (2006.01)

(52) U.S. Cl.
CPC .................... *B60R 1/078* (2013.01)

(58) Field of Classification Search
CPC ...................................... B60R 1/078
USPC ........................................... 359/872
See application file for complete search history.

(56) References Cited

U.S. PATENT DOCUMENTS

| | | | |
|---|---|---|---|
| 3,790,117 A * | 2/1974 | Winkler | B60R 1/081 359/865 |
| 4,598,982 A * | 7/1986 | Levine | B60R 1/081 359/865 |
| 4,892,400 A * | 1/1990 | Brookes | B60R 1/078 359/872 |
| 4,892,401 A * | 1/1990 | Kittridge | B60R 1/078 359/850 |
| 5,296,973 A * | 3/1994 | Burke | B60R 1/081 359/881 |
| 5,870,236 A * | 2/1999 | Barksdale | B60R 1/078 224/558 |
| 7,059,734 B1 * | 6/2006 | Hu | B60R 1/078 359/872 |
| 7,628,498 B1 * | 12/2009 | Huang | B60R 1/078 359/872 |
| 7,677,741 B2 * | 3/2010 | Chuang | B60R 1/082 359/872 |
| 7,866,835 B2 * | 1/2011 | Liu | B60R 1/078 248/475.1 |
| 9,421,912 B1 * | 8/2016 | Hu | B60R 1/078 |

(Continued)

FOREIGN PATENT DOCUMENTS

TW    I256358    6/2006

*Primary Examiner* — Ricky D Shafer
(74) *Attorney, Agent, or Firm* — Burris Law, PLLC (57) ABSTRACT

A towing mirror assembly is for mounting to an exterior rear-view mirror. The towing mirror assembly includes a positioning seat, an auxiliary mirror piece, and an engaging unit. The positioning seat is for mounting over the exterior rear-view mirror, and has a hook set for engaging removably a main mirror frame of the exterior rear-view mirror, and a receiving groove unit having an engaging groove and a connecting subunit. The auxiliary mirror piece is mounted on the positioning seat. The engaging unit has an insertion member engaging removably the engaging groove, a cover plate for engaging removably the frame rim portion of the exterior rear-view mirror, and an engaging subunit matchingly engaged with the connecting subunit.

7 Claims, 8 Drawing Sheets

(56) References Cited

U.S. PATENT DOCUMENTS

2010/0007974 A1\* 1/2010 Chuang .................. B60R 1/081
                                            359/865
2015/0022912 A1\* 1/2015 Smith .................... G02B 7/182
                                            359/865

\* cited by examiner

TOWING MIRROR ASSEMBLY

CROSS-REFERENCE TO RELATED APPLICATION

This application claims priority to Taiwanese Utility Model Application No. 112200561, filed on Jan. 16, 2023.

FIELD

The disclosure relates to a towing mirror, and more particularly to a towing mirror assembly adapted to be mounted to an exterior rear-view mirror.

BACKGROUND

A conventional towing mirror is adapted to be installed on an exterior rear-view mirror of a vehicle so that a driver of the vehicle may be able to drive safely with a broader field of vision.

Figure 8:
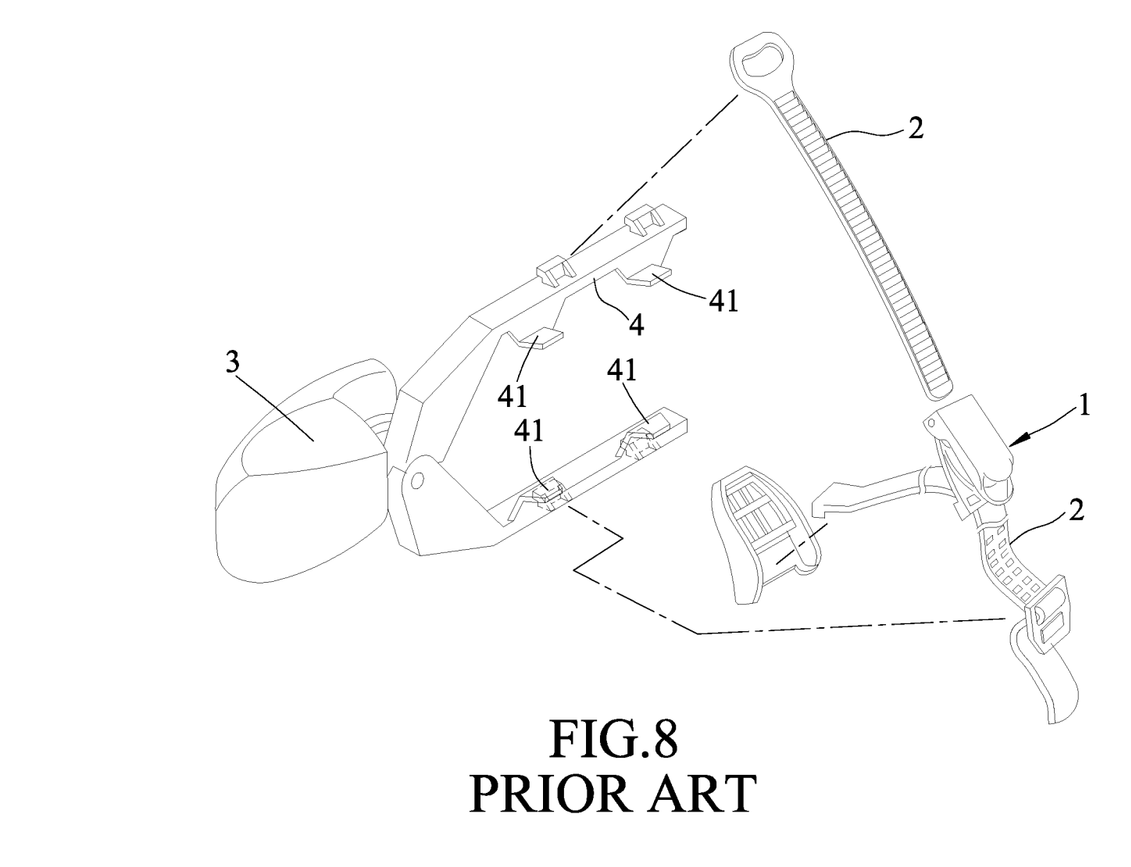
FIG. 8 is an exploded perspective view showing a conventional towing mirror and a fastening device.

Referring to FIG. 8, Taiwanese Patent No. 1256358 discloses a fastening device that includes a fastening unit 1 and two straps 2. The fastening device is adapted to fasten a conventional towing mirror 3 mounted on a supporting frame 4 to an exterior rear-view mirror of a vehicle. The supporting frame 4 has hooks 41 for attachment to a frame rim of the exterior rear-view mirror of the vehicle.

However, the fastening unit 1 of the fastening device is quite complex and has many parts which makes the fastening unit 1 difficult to assemble and manufacture. This may lead to higher costs for the manufacturers of the fastening device. Additionally, it should be noted that the straps 2 of the fastening device are serrated which may limit the available selection of materials for the straps 2, and this may also increase costs.

SUMMARY

Therefore, an object of the disclosure is to provide a towing mirror assembly that can alleviate at least one of the drawbacks of the prior art.

According to the disclosure, the towing mirror assembly is adapted to be mounted to an exterior rear-view mirror. The exterior rear-view mirror has a main mirror frame, and a main mirror that is mounted in the main mirror frame. The main mirror frame has a frame rim portion. The towing mirror assembly includes a positioning seat, an auxiliary mirror piece, and an engaging unit. The positioning seat is adapted for mounting over the exterior rear-view mirror, and has an external housing wall, an external housing rim, a hook set, and a receiving groove unit. The external housing rim extends transversely from the external housing wall and is adapted to surround the frame rim portion. The hook set extends from one side of the external housing rim and is adapted to engage removably the frame rim portion of the main mirror frame. The receiving groove unit is formed on another side of the external housing rim opposite to the hook set. The receiving groove unit has an engaging groove, and a connecting subunit that is adjacent to the engaging groove. The auxiliary mirror piece is mounted on the positioning seat and is adapted to be disposed at a lateral side of the main mirror. The engaging unit is detachably mounted to the receiving groove unit and has an insertion member, a cover plate, and an engaging subunit. The insertion member engages removably the engaging groove. The cover plate is connected to the insertion member, and is adapted to engage removably the frame rim portion of the main mirror frame. The engaging subunit is connected to at least one of the insertion member and the cover plate. The engaging subunit is matchingly engaged with the connecting subunit.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 1:
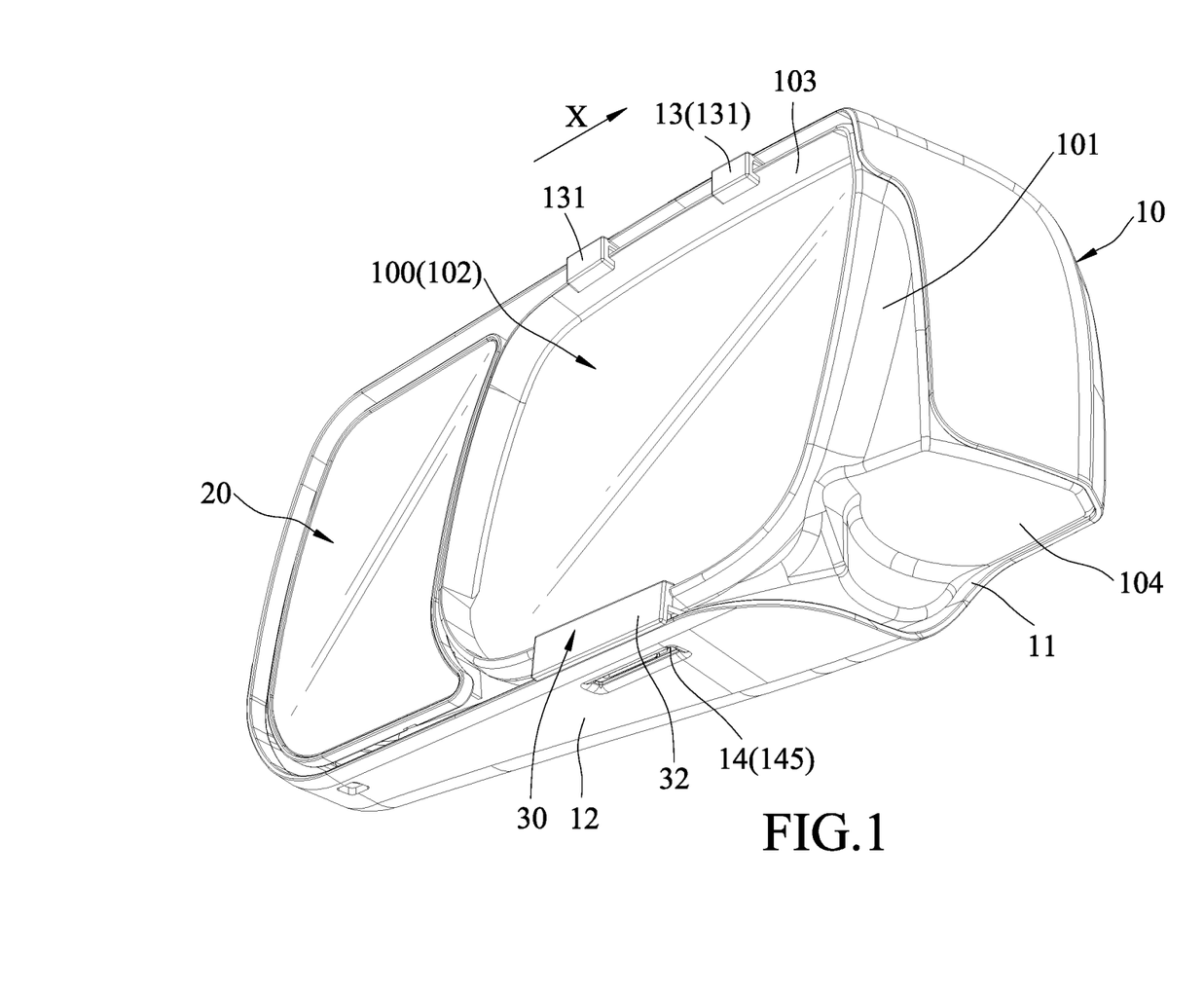
FIG. 1 is a perspective view illustrating an embodiment of a towing mirror assembly according to the present disclosure mounted to an exterior rear-view mirror.
Figure 2:
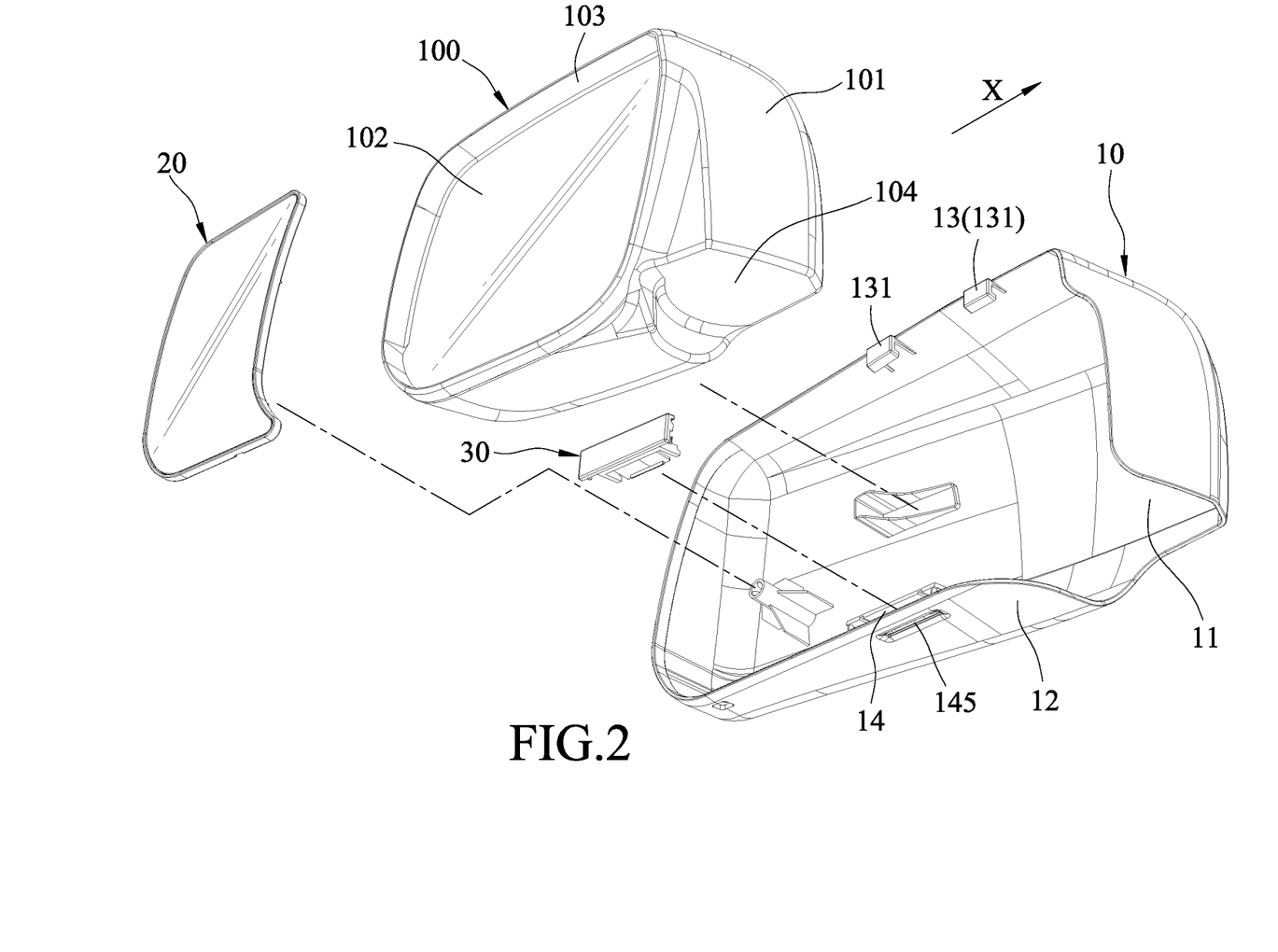
FIG. 2 is an exploded perspective view illustrating the embodiment.
Figure 5:
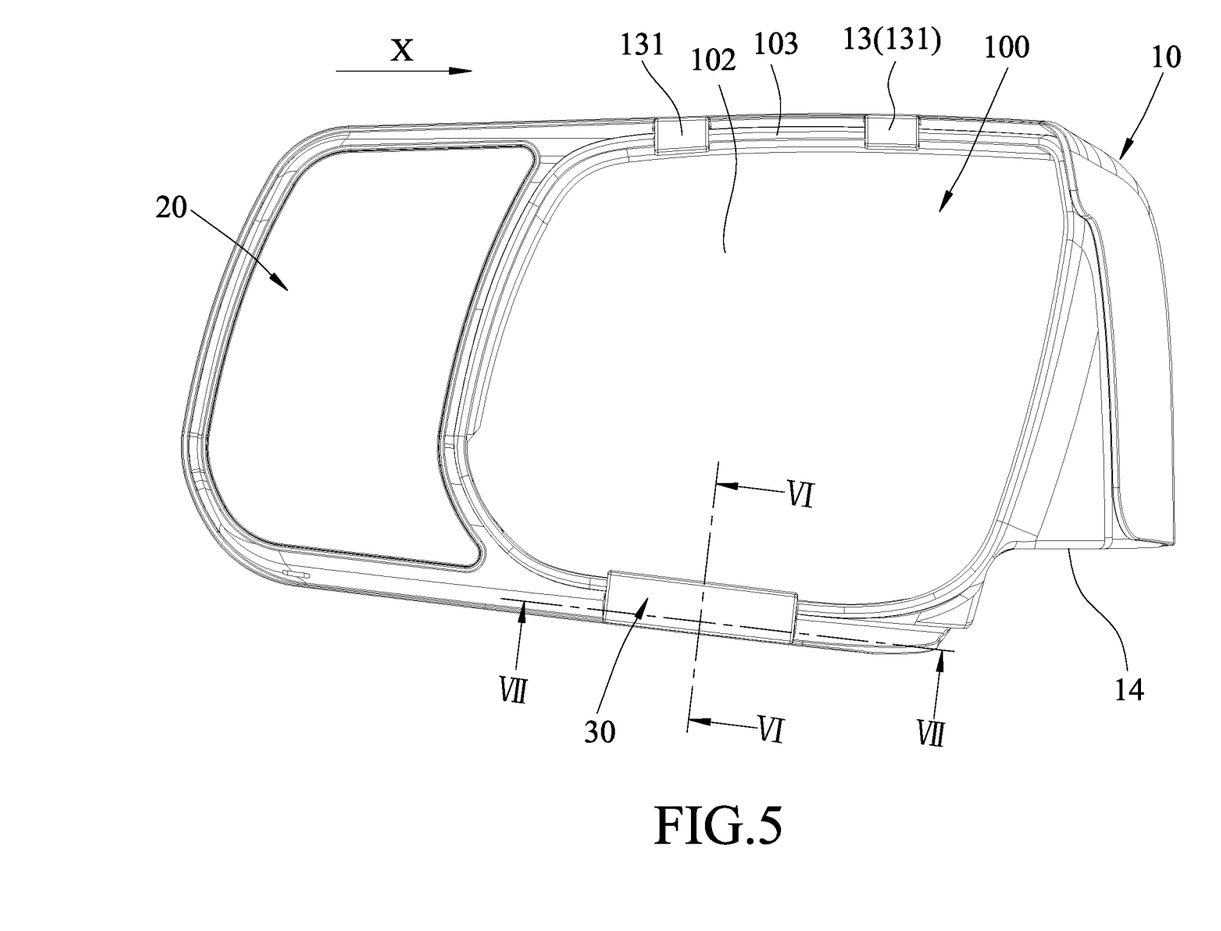
FIG. 5 is a front view of the embodiment mounted to the exterior rear-view mirror.

Referring to FIGS. 1, 2 and 5, an embodiment of the towing mirror assembly according to the present disclosure is adapted to be mounted to an exterior rear-view mirror 100. The exterior rear-view mirror 100 has a main mirror frame 101, and a main mirror 102 that is mounted in the main mirror frame 101. The main mirror frame 101 has a frame rim portion 103, and a connecting portion 104 disposed on a side of the main mirror frame 101 for being connected to a vehicle (not shown). The towing mirror assembly includes a positioning seat 10, an auxiliary mirror piece 20, and an engaging unit 30.

Figure 3:
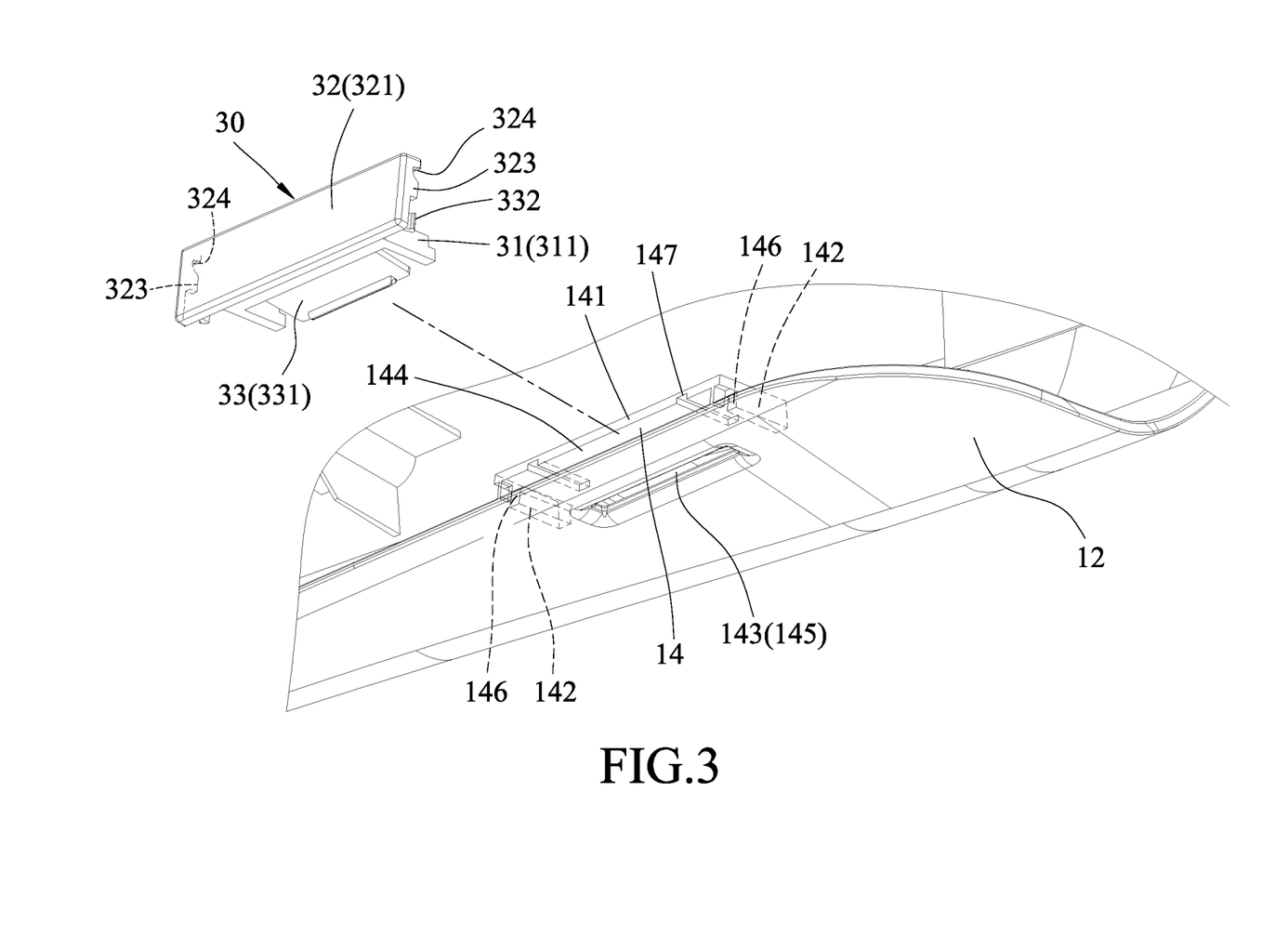
FIG. 3 is a fragmentary enlarged exploded perspective view of the embodiment.
Figure 4:
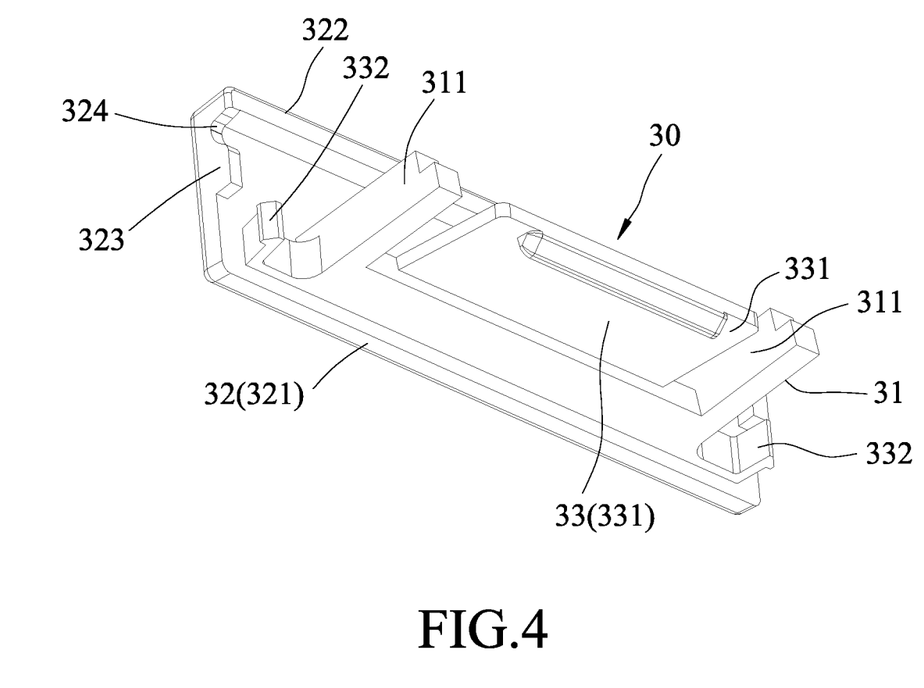
FIG. 4 is a perspective view illustrating an engaging unit of the embodiment.
Figure 6:
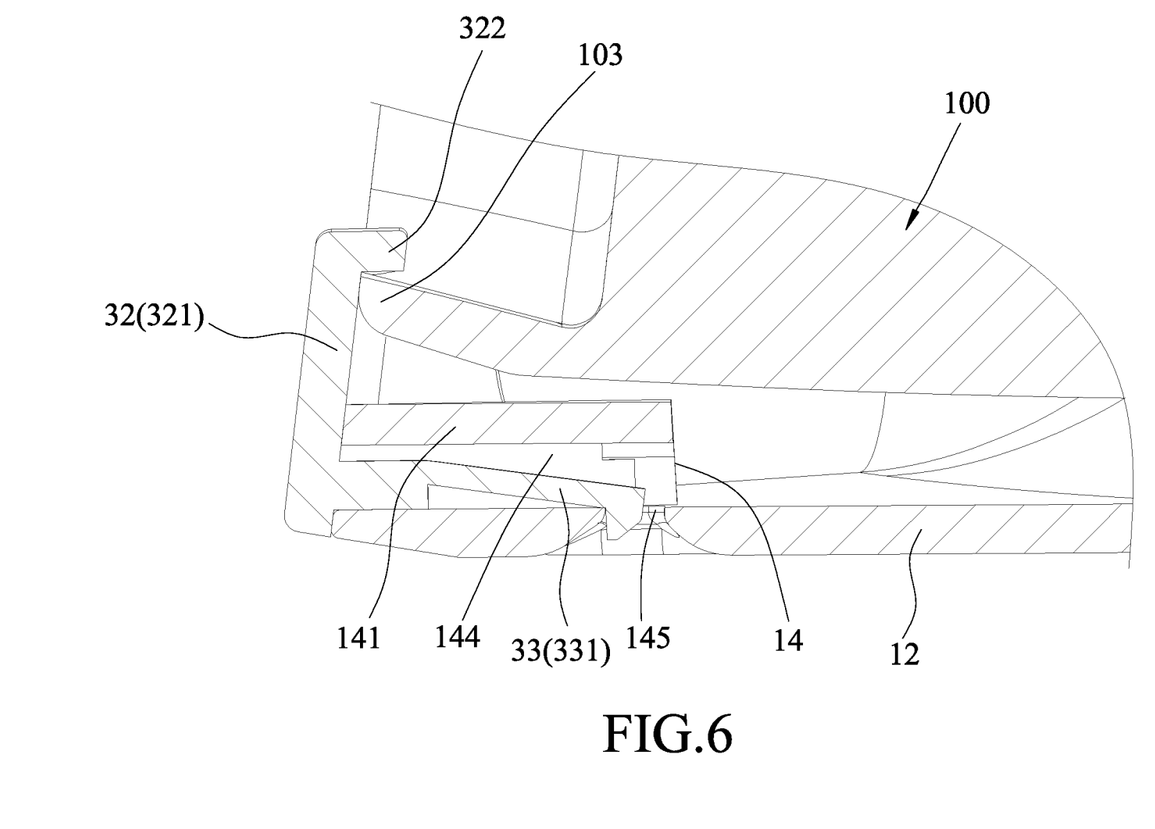
FIG. 6 is a fragmentary cross-sectional view of the embodiment taken along line VI-VI in FIG. 5.
Figure 7:
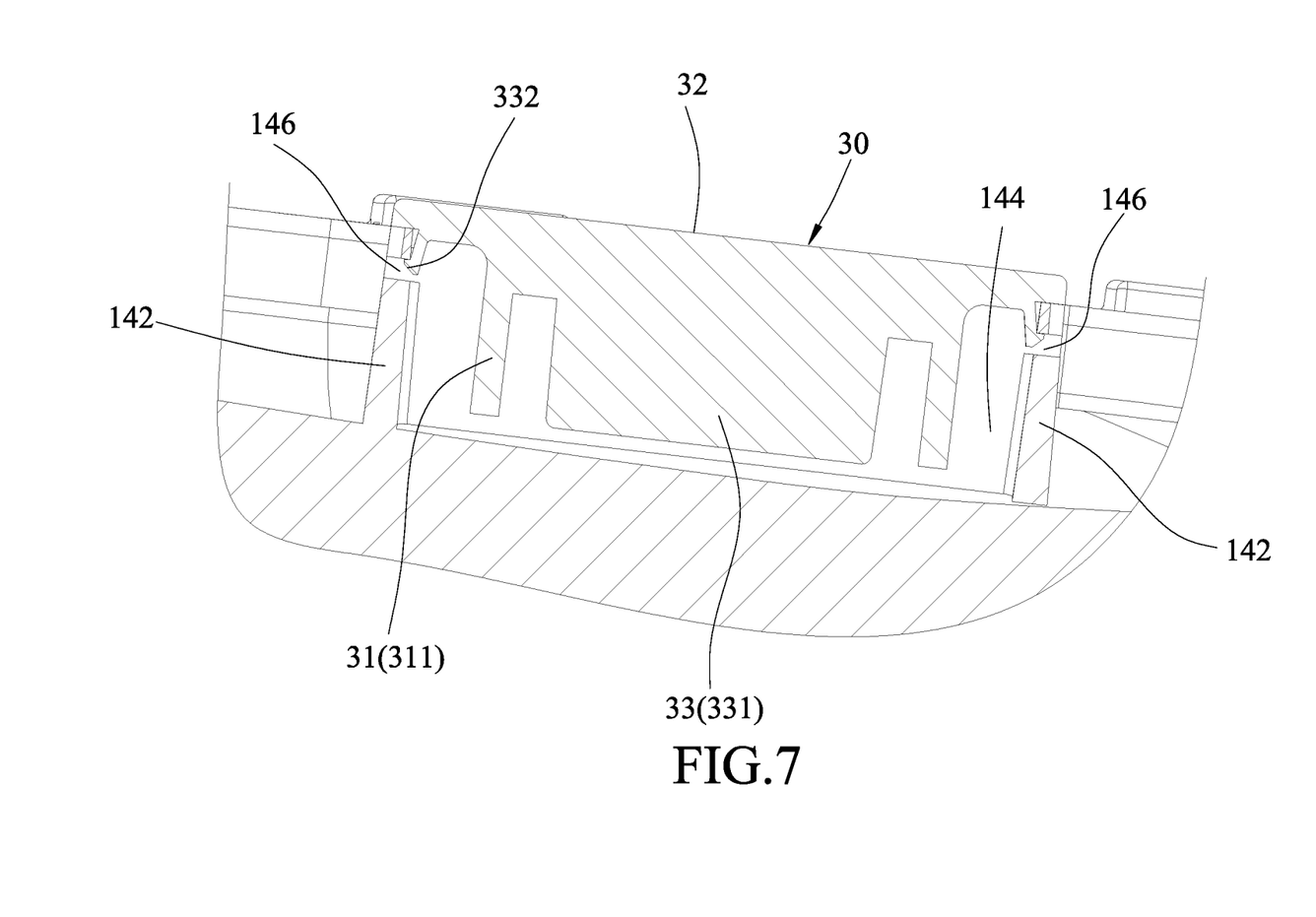
FIG. 7 is a fragmentary cross-sectional view of the embodiment taken along line VII-VII in FIG. 5.

The positioning seat 10 is adapted for mounting over the exterior rear-view mirror 100, and has an external housing wall 11, an external housing rim 12, a hook set 13, and a receiving groove unit 14. The external housing rim 12 extends transversely from the external housing wall 11 and is adapted to surround the frame rim portion 103. The hook set 13 extends from one side of the external housing rim 12 and is adapted to engage removably the frame rim portion 103 of the main mirror frame 101. The receiving groove unit 14 is formed on another side of the external housing rim 12 opposite to the hook set 13. More specifically, the hook set 13 of the positioning seat 10 has two resilient hooks 131 that are spaced apart from each other along a transverse direction (X) and that are adapted to engage removably the frame rim portion 103 of the main mirror frame 101, and each of the resilient hooks 131 is C-shaped. Referring to FIGS. 3, 6 and 7, the receiving groove unit 14 of the positioning seat 10 has a top wall 141, two side walls 142, a connecting subunit 143, and an engaging groove 144. The two side walls 142 are connected transversely between the top wall 141 and the external housing rim 12. The top wall 141, the external housing rim 12, and the sidewalls 142 cooperatively define the engaging groove 144. The top wall 141 has two guiding grooves 147 that are adjacent to the engaging groove 144. The connecting subunit 143 is adjacent to the engaging groove 144, and includes a first connecting member 145 that is formed on the external housing rim 12, and two second connecting members 146 that are respectively formed on the side walls 142 of the external housing frame 12. In this embodiment, each of the first connecting member 145 and the second connecting members 146 of the receiving groove unit 14 is a hole that is in spatial communication with the engaging groove 144.

The auxiliary mirror piece 20 is mounted on the positioning seat 10 and adapted to be disposed at a lateral side of the main mirror 102.

Referring to FIGS. 3, 4, 6 and 7, the engaging unit 30 is detachably mounted to the receiving groove unit 14 and has an insertion member 31, a cover plate 32, and an engaging subunit 33. The insertion member 31 engages removably the engaging groove 144. The cover plate 32 is connected to the insertion member 31, and is adapted to engage removably the frame rim portion 103 of the main mirror frame 101. The engaging subunit 33 is connected to at least one of the insertion member 31 and the cover plate 32. The insertion member 31 of the engaging unit 30 has two slide members 311 that are respectively engaged with the guiding grooves 147. The cover plate 32 of the engaging unit 30 includes a main plate body 321, an upper rib 322 that protrudes from the main body 321, and two side ribs 323 that protrude from the main body 321 and that are connected transversely to said upper rib 322. Each of said ribs 323 having a notch 324 that is adapted to engage an edge of the frame rim portion 103 of the main mirror frame 101 of the exterior rear-view mirror 100. The notches 324 of the side ribs 323 are adjacent to the upper rib 322. The engaging subunit 33 is matchingly engaged with the connecting subunit 143. In this embodiment, the engaging subunit 33 of the engaging unit 30 includes a first engaging member 331, and two second engaging members 332. The first engaging member 331 extends from the insertion member 31 and engages removably the first connecting member 145. The two second engaging members 332 extend from the cover plate 32 and engage respectively and removably the second connecting members 146. In this embodiment, each of the first engaging member 331 and the second engaging members 332 of the engaging unit 30 is hook-shaped and made of a resilient material. The first engaging member 331 of the engaging unit 30 is disposed between the slide members 311.

When mounting the towing mirror assembly to the exterior rear-view mirror 100, the auxiliary mirror piece 20 is first placed within the positioning seat 10. At this state, the engaging unit 30 is not yet mounted to the receiving groove unit 14. Next, the positioning seat 10 is mounted over the exterior rear-view mirror 100 with the auxiliary mirror piece 20 in place so that the auxiliary mirror piece 20 can be mounted on the positioning seat 10 and disposed at a lateral side of the main mirror 102. During this stage, the resilient hooks 131 engage the frame rim portion 103 of the main mirror frame 101 to secure the positioning seat 10 with the exterior rear-view mirror 100.

Next, the insertion member 31 of the engaging unit 30 engages the engaging groove 144 of the receiving groove unit 14, while the slide members 311 engages the guiding grooves 147 in a sliding action until the notches 324 of the side ribs 323 of the engaging unit 30 engage the edge of the frame rim portion 103, the first engaging member 331 of the engaging unit 30 engages the first connecting member 145, and the two second engaging members 332 of the engaging subunit 33 of the engaging unit 30 respectively engage the second connecting members 146. At this point, the engaging unit 30 has been successfully mounted to the positioning seat 10 with the cover plate 32 being coupled to the edge of the frame rim portion 103.

In this embodiment, the positioning seat 10 is mounted over the exterior rear-view mirror 100, the auxiliary mirror piece 20 is mounted in the external housing wall 11 of the positioning seat 10, and the engaging unit 30 is detachably mounted to the receiving groove 14. This allows the towing mirror assembly to be easily mounted to the exterior rear-view mirror 100.

In summary, the towing mirror according to the present disclosure has the advantages of having a simple and easy-to-assemble structure and low manufacturing costs, thereby achieving the object of the disclosure.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A towing mirror assembly adapted to be mounted to an exterior rear-view mirror, the exterior rear-view mirror having a main mirror frame and a main mirror that is mounted in the main mirror frame, the main mirror frame having a frame rim portion, said towing mirror assembly comprising:

a positioning seat adapted for mounting over the exterior rear-view mirror, and having an external housing wall, an external housing rim that extends transversely from said external housing wall and that is adapted to surround the frame rim portion, a hook set that extends from one side of said external housing rim and that is adapted to engage removably the frame rim portion of the main mirror frame, and a receiving groove unit that is formed on another side of said external housing rim opposite to said hook set, said receiving groove unit having an engaging groove, and a connecting subunit that is adjacent to said engaging groove;

an auxiliary mirror piece mounted on said positioning seat and adapted to be disposed at a lateral side of the main mirror; and an engaging unit detachably mounted to said receiving groove unit, and having an insertion member that engages removably said engaging groove, a cover plate that is connected to said insertion member and that is adapted to engage removably the frame rim portion of the main mirror frame, and an engaging subunit that is connected to at least one of said insertion member and said cover plate, said engaging subunit being matchingly engaged with said connecting subunit.

2. The towing mirror assembly as claimed in claim 1, wherein:

said receiving groove unit of said positioning seat further has a top wall, and two side walls that are connected transversely between said top wall and said external housing rim, said top wall, said external housing frame, and said sidewalls cooperatively defining said engaging groove;

said connecting subunit including a first connecting member that is formed on said external housing frame, and two second connecting members that are respectively formed on said side walls of said external housing rim; and said engaging subunit of said engaging unit includes a first engaging member that extends from said insertion member and that engages removably said first connecting member, and two second engaging members that extends from said cover plate and that engage respectively and removably said second connecting members.

3. The towing mirror assembly as claimed in claim 2, wherein each of said first connecting member and said second connecting members of said receiving groove unit is a hole, and each of said first engaging member and said second engaging members of said engaging unit is hook-shaped and made of a resilient material.

4. The towing mirror assembly as claimed in claim 2, wherein:

said top wall of said receiving groove unit of said positioning seat has two guiding grooves that are adjacent to said engaging groove; and said insertion member of said engaging unit has two slide members that are respectively engaged with said guiding grooves.

5. The towing mirror assembly as claimed in claim 4, wherein said first engaging member of said engaging unit is disposed between said slide members.

6. The towing mirror assembly as claimed in claim 1, wherein said hook set of said positioning seat has two resilient hooks that are spaced apart from each other and that are adapted to engage removably the frame rim portion of the main mirror frame, each of said resilient hooks is C-shaped.

7. The towing mirror assembly as claimed in claim 1, wherein said cover plate of said engaging unit includes a main plate body, an upper rib that protrudes from said main plate body, and two side ribs that protrude from said main plate body and that are connected transversely to said upper rib, each of said side ribs having a notch that is adapted to engage an edge of the frame rim portion, said notches of said side ribs being adjacent to said upper rib.

* * * * *